United States Patent [19]
Varnam

[11] Patent Number: 5,149,443
[45] Date of Patent: Sep. 22, 1992

[54] SYSTEM FOR RECOVERING OIL FROM THE OCEAN CONTROLLED BY WAVE PROFILE GENERATING COMPUTER

[75] Inventor: O'Neal Varnam, Supply, N.C.

[73] Assignees: Jay R. Houston, Shallotte; Nancy Champion, Long Beach; Mason H. Anderson; Shelia K. McLamb, both of Shallotte; Samuel N. Varnam, Supply, all of N.C.

[21] Appl. No.: 732,486

[22] Filed: Jul. 18, 1991

[51] Int. Cl.⁵ ............................ C02F 1/40; G06F 15/54
[52] U.S. Cl. .................................... 210/739; 210/104; 210/143; 210/170; 210/242.3; 210/747; 210/776; 364/420
[58] Field of Search ............... 210/85, 87, 96.1, 97, 210/122, 143, 170, 242.3, 258, 739, 747, 776, 923, 195.1, 187, 742–749, 86, 104, 406; 364/420

[56] References Cited

U.S. PATENT DOCUMENTS

| | | | |
|---|---|---|---|
| 3,221,884 | 12/1965 | Muller | 210/923 |
| 3,348,690 | 10/1974 | Cornelissen | 210/923 |
| 3,890,234 | 6/1975 | Galcia | 210/923 |
| 4,105,554 | 8/1978 | Janson | 210/923 |
| 4,202,036 | 5/1980 | Bowditch et al. | 364/420 |
| 5,047,156 | 9/1991 | Sullivan | 210/242.3 |
| 5,075,014 | 12/1991 | Sullivan | 210/242.3 |
| 5,091,095 | 2/1992 | Thomas et al. | 210/744 |

FOREIGN PATENT DOCUMENTS

| | | | |
|---|---|---|---|
| 2917614 | 11/1980 | Fed. Rep. of Germany | 210/242.3 |
| 2398845 | 3/1979 | France | 210/242.3 |
| 703412 | 12/1979 | U.S.S.R. | 210/923 |

*Primary Examiner*—Robert A. Dawson
*Assistant Examiner*—Joseph Drodge
*Attorney, Agent, or Firm*—Rhodes, Coats & Bennett

[57] ABSTRACT

The present invention is an oil recovery system designed to work in conjunction with a vessel. Forming a part of the system is a floating boom structure which confines oil laying at or just below the water's surface and directs the same to an independently mounted nozzle. Oil and water at the nozzle are induced into the nozzle by a vacuum. The depth and attitude of the nozzle are adjustable and the nozzle is movable up and down and side to side. Wave and weather sensors measure various parameters including water temperature, wave amplitude, wave velocity, wave direction, vessel speed, air temperature, and oil layer thickness. The sensors provide input to a computer which continuously generates a cyclic wave profile. The nozzle is automatically controlled and moved in accordance with this wave profile. In this way, the nozzle is maintained at an optimal depth for oil skimming irrespective of changing surface conditions such as wave amplitude, wave velocity, and wave direction. Resultantly, oil at the surface of the body of water is quickly and efficiently collected. Collected oil and water are separated by a series of oil-water separators stationed on the vessel.

23 Claims, 9 Drawing Sheets

SYSTEM FOR RECOVERING OIL FROM THE OCEAN CONTROLLED BY WAVE PROFILE GENERATING COMPUTER

FIELD OF THE INVENTION

The present invention relates to water surface oil recovery systems and more particularly to an oil skimmer having a suction nozzle.

BACKGROUND OF THE INVENTION

Large oil spills occur regularly on lakes, oceans, estuary sounds and other bodies of water. Such environmental catastrophes are an unfortunate result of the mass transport of oil worldwide. The impact of an oil spill on the environment is directly and significantly related to the speed and comprehensiveness of the subsequent clean-up. If the method of clean-up requires a long time to initiate or proceeds slowly, then the oil tends to disperse and settle so that it is much harder or impossible to collect. If the method of clean-up tends to be incomplete, then the uncollected oil remains to harm the environment. Inefficient methods of clean-up involve great expense in addition to being slow and inadequate.

Water surface oil recovery methods generally have basic components in common. A confinement structure which floats on the surface and may extend somewhat into the water is generally used in conjunction with a collecting means. The confinement structure and collecting means are usually supported by a vessel or vessels which also house a separator system and a storage facility. As the confinement structure is towed or pushed across the surface of the water by the vessel or vessels, oil at the surface that comes within the path of the confinement structure is directed into the path of the collecting means. The collecting means serves to remove the oil and water at the surface. The collected oil and water are processed through the separator system. The separated oil is conveyed to the storage facility and the water is generally returned to the body of water.

Many methods and devices for recovering oil laying at the surface tend to be non-comprehensive and slow in water having waves. Most methods involve skimming the surface of the water with a fixed position collecting means. On a placid body of water, this method may have some measure of success. However, on water having waves, a fixed position collecting means is unable to remain at the water's surface. The collecting means usually lies too deep or too shallow in the water because it cannot adapt to the waves' crests and troughs. What is actually collected includes an undesirably large amount of water and air, and a limited amount of oil. This puts a great burden on the associated oil and water separator system and, because the rate of separation is the limiting factor in many designs, significantly slows the collection process. Unless the method includes some provision for collecting the large amount of oil not collected on the first pass, this oil remains in the body of water. Even with such provision, the collection is slowed, allowing the oil to disperse and settle, hence making the oil uncollectible. In addition to the damage done to the environment, the slow and inefficient methods described above cost man hours and fuel, and further damage the public image of the entity responsible for the oil spill.

Oil spills have several variable characteristics that must be taken into account to effectively recover the oil. The thickness of the oil layer determines how deeply the collecting means should skim in order to collect the most oil with the least water. Skimming too deeply overburdens the separator system by collecting too much water. Skimming too shallowly leaves oil behind and actually tends to disperse the oil. The temperatures in the water and the air influence the rate at which the oil can be collected and separated. Cold temperatures reduce the viscosity of the oil so that collection and separation are impeded. Present methods of oil skimming do not adequately account for and compensate for these factors.

Many methods and apparatuses for surface oil recovery include extensive collecting means and confinement structures which require several boats to tow them. Some recovery systems with less extensive collection means and confinement structures still cannot be practically moved at a high rate of speed because their collecting means and confinement structures cannot be disengaged from the water's surface. As previously discussed, speed is of the essence in cleaning up oil spills. A method or apparatus that requires several vessels to operate or requires the towing of a large structure through the water is necessarily slow. Such a method or apparatus is also expensive and inefficient. These methods are further slowed by the restricted maneuverability that results from having extensive and difficult to control collecting means and confinement structures. Where the oil spill is caused by a leaking vessel that continues to leak oil, it is often desirable to place the oil recovery apparatus close to or in contact with the leaking vessel. The aforementioned recovery apparatuses are often incapable of maneuvering into the necessary closed quarters, especially on rough waters.

There exists the need for a quick, maneuverable, efficient and effective method and apparatus for skimming oil or other immiscible liquids laying at the surface of a body of water. There exists an even greater need for such a skimming method and apparatus which is capable of effectively skimming oil on bodies of water having waves.

SUMMARY AND OBJECTS OF THE PRESENT INVENTION

The present invention is a method and an apparatus for recovering oil or other immiscible liquid laying at the surface of a lake, ocean, estuary sound, or other body of water and is designed to overcome the problems and disadvantages of prior oil recovery methods. The present invention has a floating boom structure which confines oil interiorly thereof and directs the oil to an independently mounted nozzle disposed within the interior of the floating boom structure. Oil and water at the nozzle are induced into the nozzle by a vacuum. The nozzle is moveable in various directions. The nozzle and floating boom structure may be elevated above the water or deployed therein as desired. A plurality of sensors measure conditions pertinent to the oil collection process. The measurements are input into a computer which generates and continuously modifies a wave profile. This wave profile is utilized to control the bodily movement of the nozzle such that the nozzle is maintained at an optimum attitude with respect to the water's surface. Oil and water collected at the nozzle are conveyed to a conventional separation system on board the supporting vessel or cooperating vessel.

It is therefore an object of the present invention to provide an efficient, effective surface oil recovery system for the ocean and other bodies of water.

It is another object of the present invention to provide an oil recovery system for the ocean and other bodies of water that has nozzle control which is quickly responsive to changing conditions of the water.

It is another object of the present invention to provide an oil recovery system for the ocean and other bodies of water which is able to collect surface oil at a high rate.

It is another object of the present invention to provide an oil recovery system for the ocean and other bodies of water which can efficiently and effectively separate oil from water.

It is an object of the present invention to provide an oil recovery system for the ocean and other bodies of water which has or can be integrated with a vessel having substantial storage capacity.

It is another object of the present invention to provide an oil recovery system for the ocean and other bodies of water which is relatively compact.

Another object of the present invention is to provide an oil recovery system that has the capability of generating a surface profile of the body of water that is to be acted upon.

Another object of the present invention resides in the provision of an oil recovery system of the character referred to above that includes a controlled suction nozzle that is controlled in accordance with the surface profile generated.

Another object of the present invention resides in the provision of an oil recovery system of the character referred to above for use in conjunction with a vessel where there is provided a series of tank-type oil separators that may be controlled such that they also function as oil storage units.

Another object of the present invention resides in the provision of an oil recovery system of the character referred to above having a floating boom structure that can be moved between an operative position where it lies upon the body of water being acted upon and an inoperative position.

Another object of the present invention resides in the provision of an oil recovery system that is provided with a floating boom structure that acts to confine the oil within a generally V-shaped area for removal by a universally mounted suction nozzle that can be raised, lowered, turned to either side, or tilted.

It is another object of the present invention to provide an oil recovery system for the ocean and other bodies of water which can be deployed quickly.

Other objects and advantages of the present invention will become apparent and obvious from a study of the following description and the accompanying drawings which are merely illustrative of such invention.

BRIEF DESCRIPTION OF THE INVENTION

Figure 1:
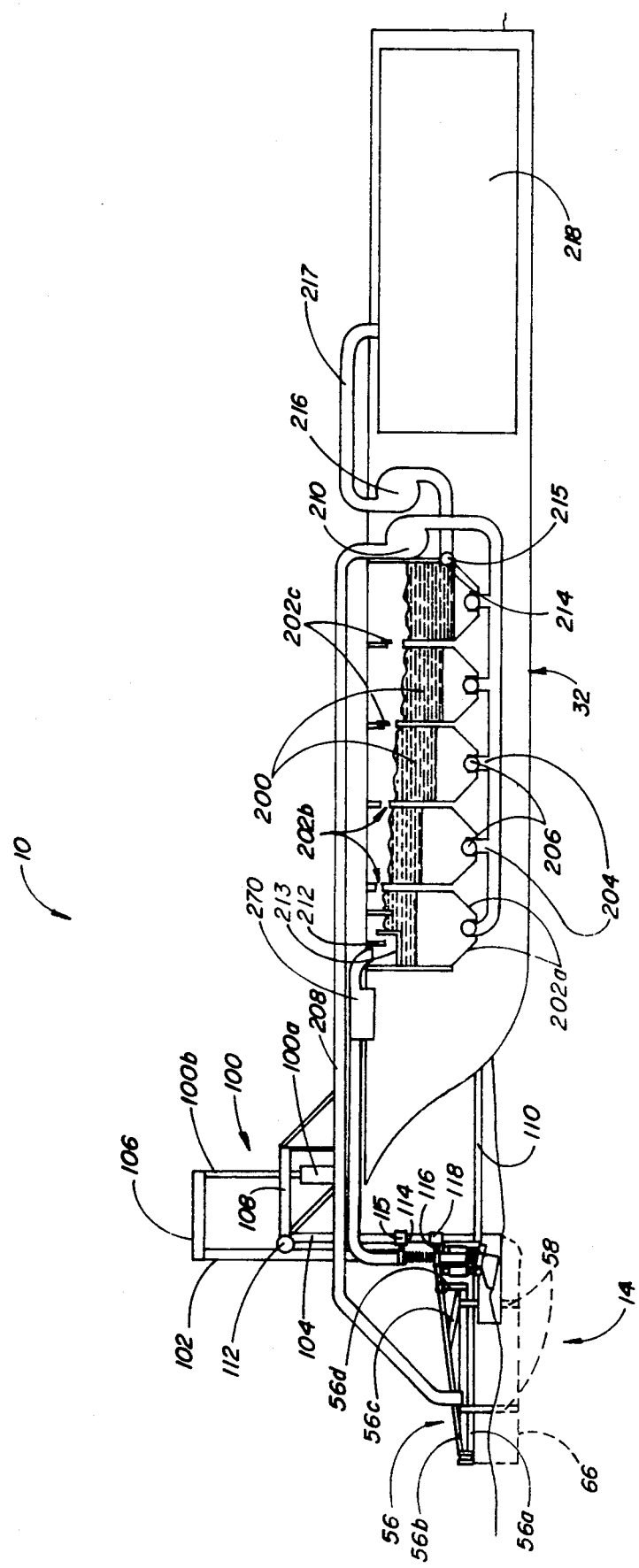
FIG. 1 is a longitudinal sectional view illustrating the oil recovery system of the present invention mounted on and incorporated into a vessel.

With further reference to the drawings, the oil recovery system of the present invention is shown therein and indicated generally by the numeral 10 and is designed to be mounted on a boat or vessel 32. Before beginning a detailed discussion of a structure and operation of the oil recovery system 10 of the present invention, it will be beneficial to review the basic sub-systems that comprise the present invention.

In this regard, a floating boom structure indicated generally by the numeral 14 is mounted about the bow of the vessel 32. Floating boom structure 14 may be raised and lowered between an elevated inoperative position and a lowered operative position. To vertically adjust the height of the floating boom structure 14, there is provided a height adjustment mechanism or structure indicated generally by the numeral 16.

Associated with the floating boom structure 14 is a suction nozzle sub-system 18. The suction nozzle sub-system 18 includes a nozzle that is maintained at the proper attitude with respect to the water, oil-water interface and water surface. The nozzle, which is powered by a turbine, effectively induces oil or an oil-water mixture into the nozzle and through a conduit that leads from the nozzle to a series of separation tanks that from a part of an oil-water separation sub-system that is indicated generally by the numeral 22. As will be understood from subsequent portions of this disclosure, the suction nozzle sub-system 18 is provided with a hydraulic control network that will raise and lower the nozzle, move the nozzle from side-to-side, adjust the attitude or pitch of the nozzle, or position the nozzle 250 in any number of different orientations so as to effectively skim and remove oil from a changing ocean surface. From the oil-water separation sub-system 22, separated oil is conveyed to a storage tank 218 that may be carried on the vessel 32 or towed in a second vessel.

Finally, the oil recovery system of the present invention includes a computer logic control system 20 that controls the nozzle sub-system 18 as well as the oil-water separation sub-system 22. In particular, various parameters such as wave amplitude, wave speed, wind direction, vessel speed, etc. are input into a microprocessor and by utilizing commercially available software, a wave surface profile is generated. Thereafter, the computer logic control system controls the movement of the nozzle such that the nozzle precisely follows the surface of the water, taking into account the oil thickness so as to efficiently skim an optimum and desirable oil-water mixture from the surface of the body of water being treated. As noted above, the same computer logic control system continuously senses the oil-water concentrations passing through the separation sub-system 22 and by controlling the flow of the oil-water mixture an efficient oil-water separation process is actually achieved onboard the vessel 32 itself.

Now turning to a detailed discussion of the oil removal system 10 of the present invention and particularly the floating boom structure 14, it is seen that the floating boom structure 14 includes a pair of floating arms 50 and 52 that diverge outwardly to form an oil collecting area 54. Secured to the floating arms 50 and 52 and depending downwardly therefrom is a pair of boom skirts 66 and 60.

Secured on top the floating arms 50 and 52 is a beam assembly 56 that supports the floating arm 52. As seen in the drawings and particularly in FIGS. 1 and 3, beam assembly 56 includes a lower beam member 56a that is secured to a respective floating arm 50 or 52 through strap 58. Also forming a part of the beam assembly is an upper member 56b that is connected to the lower member 56a through a series of truss-like connecting arms 56c. Formed about each side of the beam assembly 56 and connected to the lower and upper beam members 56a and 56b is a pair of laterally spaced vertically oriented pivot sleeves 56d.

In order to adjust the oil collecting area 54, the floating arms 50 and 52 and the connecting beam assembly 56 can be moved back and forth with respect to each other to vary the effective area encompassed by the floating arms 50 and 52. To achieve that, a block and tackle assembly, indicated generally by the numeral 62, is connected between the outboard or distal ends of the floating arms 50 and 52. Block and tackle assembly 62 includes a series of control lines 62b that are threaded through pulley assemblies 62c and which are coupled together by a conventional block 62a. Thus, it is appreciated that by adjusting block and tackle 62, that the effective oil collecting area 54 defined within the triangle formed by the floating arms 50 and 52 and block and tackle 62 can be adjusted.

Figure 2:
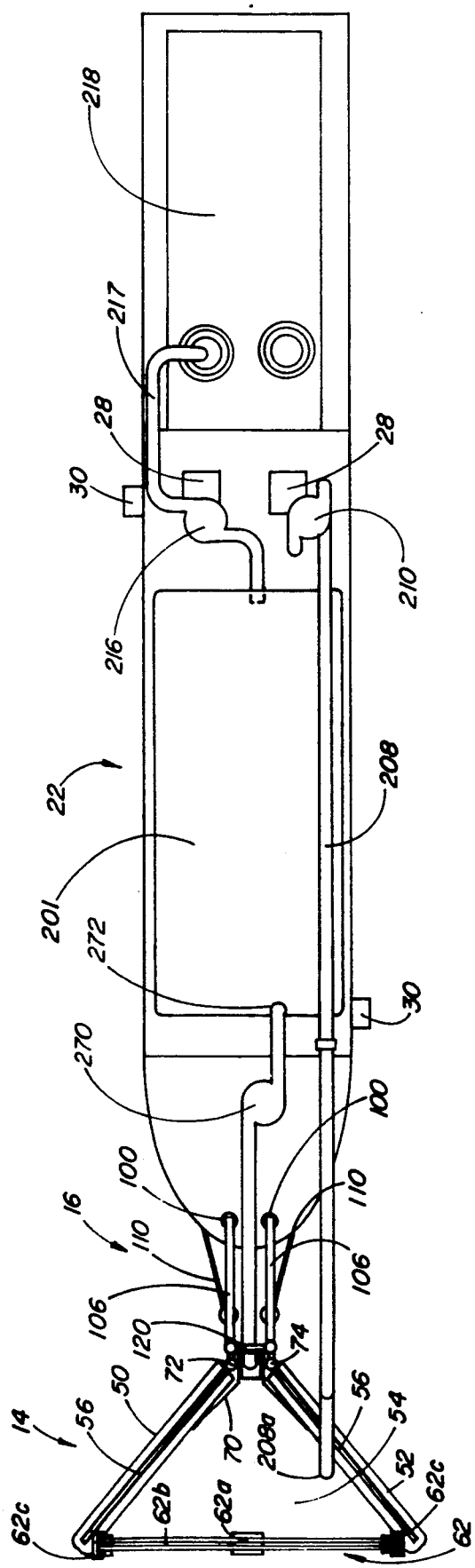
FIG. 2 is a top plan view illustrating the oil recovery system of the present invention mounted on and incorporated into a vessel.
Figure 6:
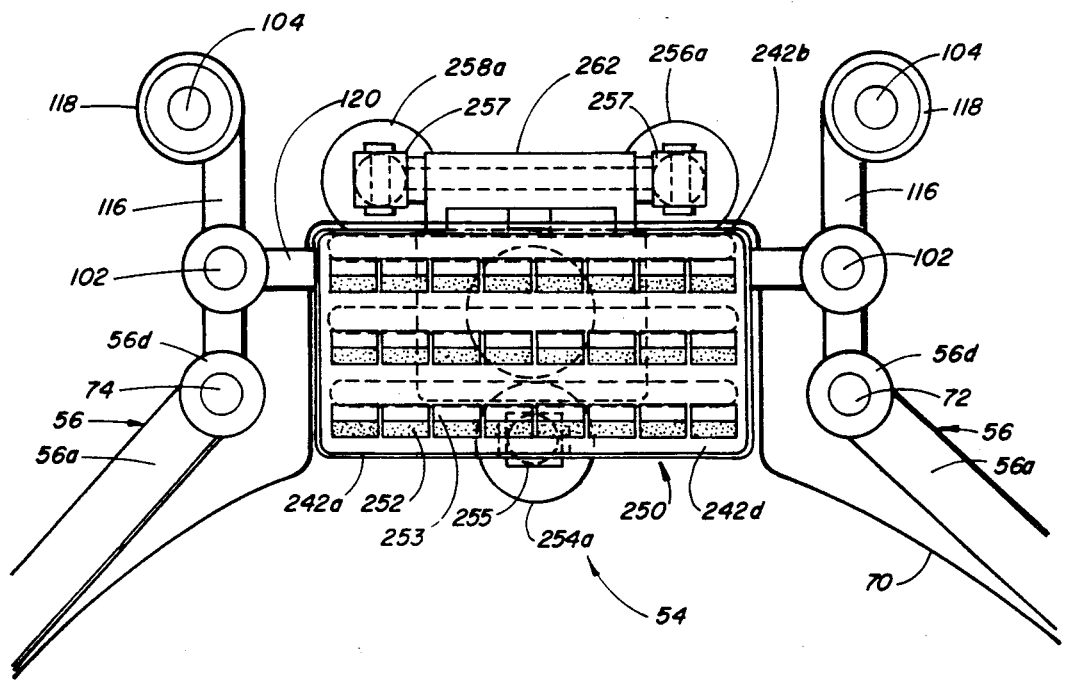
FIG. 6 is a bottom plan view of the nozzle assembly and the controls therefore.
Figure 7:
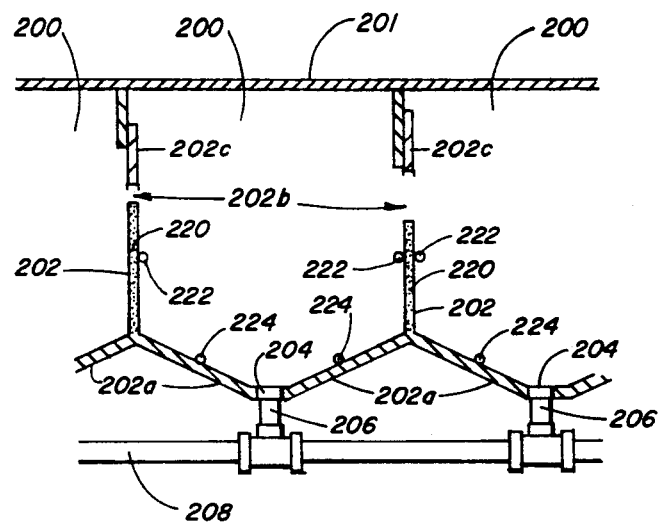
FIG. 7 is a fragmentary schematic view showing a portion of the oil-water separation system that forms a part of the present invention.

With reference to FIGS. 2 and 6, it is seen that a flexible spring guide 70 extends along the inboard side of each floating arm 50 and 52 and winds around an apex area formed by the converging floating arms 50 and 52. This flexible spring guide 70 is anchored within the apex area of the floating arms 50 and 52 and because of the spring nature of the guide structure 70 itself, its extending arms or fingers tend to be biased towards engagement with the floating arms 50 or 52. As will be appreciated from subsequent portions of this disclosure, the flexible spring guide 70 tends to retain and corral the oil and oil-water mixture about the surface of the water and within the oil collection area 54. It is important to trap and retain the oil and the oil-water mixture such that it does not inadvertently pass through the oil collection area 54 without being acted on by the nozzle sub-system 18.

Mounted to the inboard sides of the floating arms 50 and 52 is a plurality of wave sensors 152. Wave sensors 152 are commercially available devices that are used in other liquid environments to sense conditions in and about the liquid. For example, it is common practice to provide wave or liquid sensors in the form of resistent type potentiameters. In any event, the wave sensors 152 mounted on the inboard side of the respective floating arms 50 and 52 serve to sense the amplitude of waves passing through the oil collection area 54 as well as other water variables such as wave velocity, etc. Also mounted on the floating arms 50 and 52 is at least one acoustical type oil layer thickness sensor 158. Sensor 158 acts to sense and determine the thickness of the oil layer lying within the defined oil collection area 54.

Figure 3:
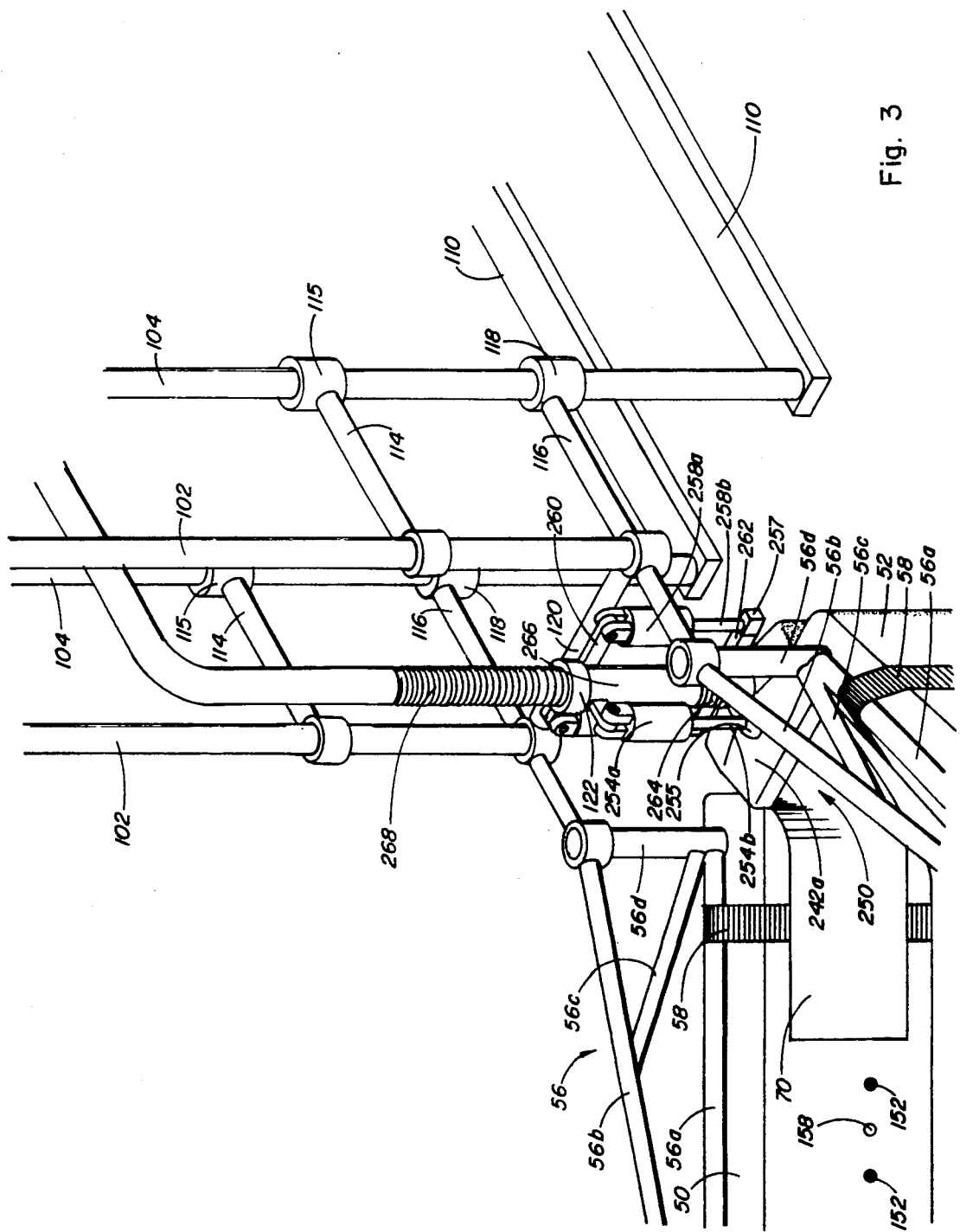
FIG. 3 is a perspective view illustrating the boom structure, boom structure height adjustment mechanism, nozzle assembly, and controls for the nozzle assembly, all of which form a part of the oil recovery system of the present invention.
Figure 4:
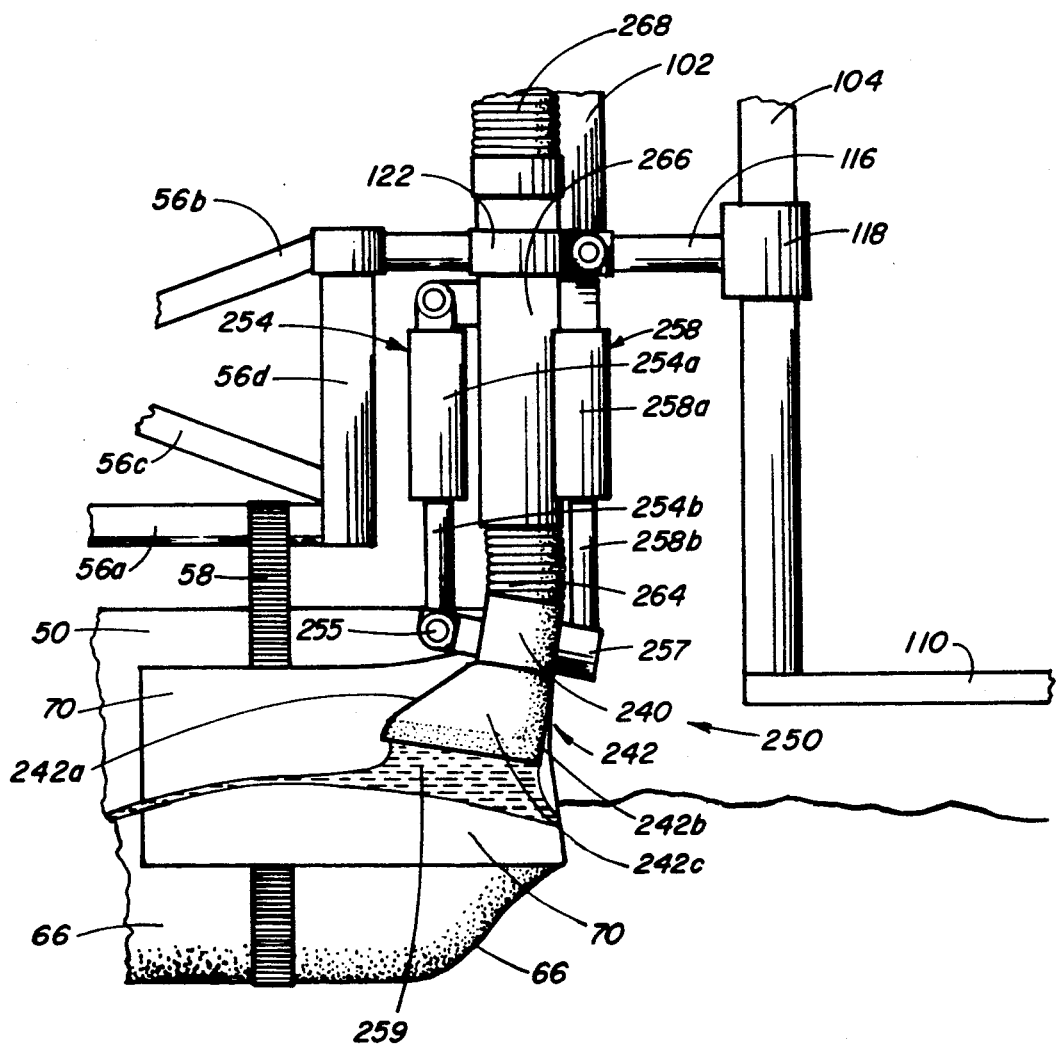
FIG. 4 is a fragmentary side elevational view illustrating the nozzle assembly and the controls therefore.
Figure 5:
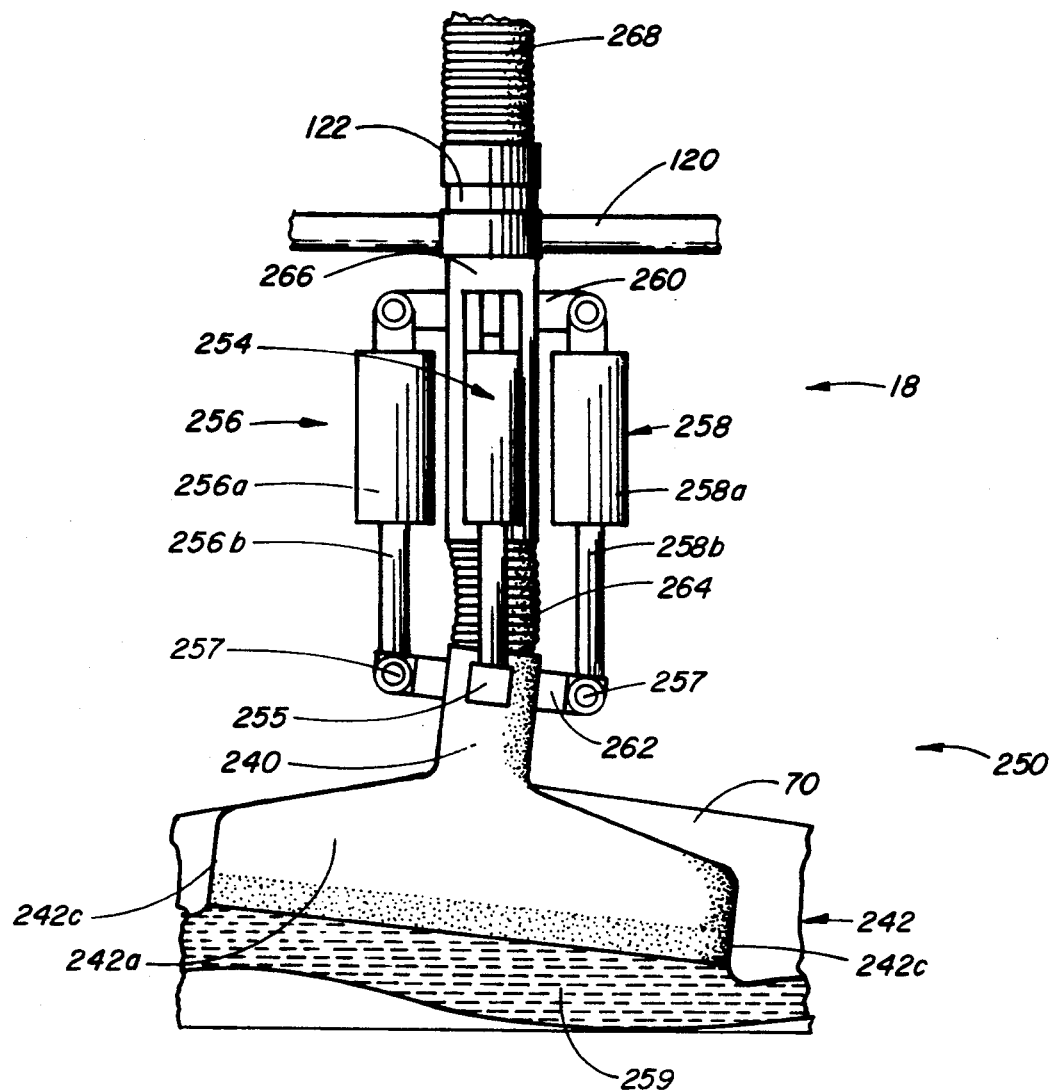
FIG. 5 is a fragmentary front elevational view of the nozzle assembly and the controls therefore.

Floating boom 14 just described is moveable from an elevated inoperative position to a lower surface engaging operative position. To drive the floating boom structure 14, between the elevated and lower positions, there is provided a boom structure vertical adjustment mechanism, indicated generally by the numeral 16, which is supported on the vessel 32 itself. Viewing the vertical adjustment mechanism 16 in more detail, it is seen that the same is powered by a pair of hydraulic piston assemblies indicated generally by the numeral 100. Each hydraulic piston assembly 100 includes a hydraulic cylinder 100a that is anchored or connected to the vessel 32 and which extends upwardly therefrom. Extending from cylinder 100a is a rod 100b which extends upwardly and connects to a vertical control bar brace 106. Each bar brace 106 is connected to a downwardly extending vertical control bar 102. As seen in the drawings, each control bar 102 includes a gear teeth surface formed about the rear edge thereof, the gear teeth surface of each vertical control bar 102 being engaged with a guide or idler wheel 112. The lower terminal end of each vertical control bar 102 is connected to a lower horizontal guide arm 116. As seen in FIG. 3, guide arm 116 extends both forwardly and rearwardly from the vertical control bar 102. The forward portion of lower guide arm 116 is connected to sleeve 56d that forms a part of the beam assembly 56 by a pivot pin 72 or 74. It is understood that as an alternative embodiment sleeve 56d may be coupled directly below vertical control bar 102 without the forward portion of lower guide arm 116. The rear extending portion of lower guide arm 116 includes a sleeve 118 that surrounds a rear vertical stabilizer bar 104. Each rear vertical stabilizer bar 104 is supported by a lower stabilizer brace 110 that projects forwardly from the vessel 32 and by an upper stabilizer bar brace 108 that also is supported or connected to the vessel 32.

There is also provided an upper horizontal guide arm 114 that extends from each vertical control bar 102 rearwardly to where an upper sleeve 115 formed on the terminal end of the upper guide arm 114 surrounds stabilizer bar 104. Consequently, it is appreciated that as the hydraulic piston assemblies 100 power the vertical control bars 102 up and down, that the vertical control bars are guided and stabilized by the upper and lower guide arms 114 and 116 and the respective sleeves 115 and 118 that couple the guide arms to control bars 102.

Connected between lower horizontal guide arms 116 and particularly the vertical control bars 102 is a horizontal cross-member 120 that has a collar 122 formed generally mid-way thereof about the forward edge of the cross-member 120. Thus, it is appreciated that the vertical adjustment mechanism 16 just described acts to move the entire floating boom structure 14 from a lower water engaged position shown in FIG. 1 to an elevated inoperative position where the floating boom structure is spaced over the surface of the water. It follows that in the elevated position, the vessel 32 can be moved from one location to another in an expeditious fashion.

Turning now to the nozzle sub-system 18 and its controls, it is seen from the drawings that the nozzle sub-system is mounted to the vertical adjustment mechanism 16 just described. Thus, as the vertical adjustment mechanism is raised and lowered, the nozzle sub-system 18, including its controls, are raised and lowered accordingly. In FIG. 3, it is shown where the nozzle sub-system 18 is mounted to the vertical adjustment mechanism 16. In particular, nozzle sub-system 18 includes a fixed duct 266 that is secured and fixed within collar 122 extending forwardly from cross-member 120 that forms a part of the vertical adjustment mechanism 16. It is through this fixed duct 266 that the nozzle (indicated generally by the numeral 250) and its controls are supported.

First viewing nozzle 250, it is seen that the same includes a nozzle housing comprised of a front panel 244a, a back panel 242b, a pair of side panels 242c, and a bottom plate 242d. Formed about the top portion of the nozzle 250 is a control neck 240. Control neck 240 is in turned coupled to a flexible telescopic coupling 264 which is in turn connected to the central fixed duct 266 carried by the vertical adjustment mechanism 16.

To move and articulate suction nozzle 250, there is provided a series of hydraulic piston assemblies indicated generally by the numeral 254, 256, and 258. It is seen that this control network includes a central hydraulic piston 254, a left hydraulic control piston 256 and a right hydraulic control piston 258. Each piston includes a hydraulic cylinder, 254a, 256a or 258a, and a rod 254b, 256b or 258b.

Fixed to the upper rear portion of fixed duct 266 is an upper cross bar 260. Disposed below upper cross bar 260 is a lower cross bar 262 that is secured to the back of control neck 240. Left and right hydraulic control piston assemblies 256 and 258 are interconnected between the upper and lower cross bars 260 and 262. In particular, each hydraulic cylinder assembly 256 and 258 is pinned to the upper cross bar and extends downwardly therefrom to where the rod end of the respective hydraulic cylinders couple to lower cross bar 262 through a pair of dual axis pivot joints 257. Essentially, the rod of each of the left and right hand piston assemblies 256 and 258 can pivot about dual axes with respect to the lower cross bar 262.

Likewise, central hydraulic control piston assembly 256 is anchored to the fixed duct 266 about the top portion thereof and extends downwardly therefrom where the remote end of the rod 254b connects through a dual axis pivot joint 255 to the front side of the control neck 240.

Connected to the fixed and rigid suction line 266 is final suction line 268 that extends from outboard the vessel 32 to the vessel. Final suction line 268 is communicatively connected to a turbine 270 that is effective to generate a suction within nozzle 250. Also, the remote end of final suction line 268 is referred to as an outlet end 272. As will be understood from the subsequent portions of this disclosure, the oil and the oil-water mixture being conveyed within the suction lines 264, 266 and 268 are discharged through outlet end 272 into the oil-water separation sub-system 22.

The present invention contemplates the capability of varying the suction about the bottom 242d of the nozzle 250 depending upon the thickness of the oil layer being removed and other conditions about the water and nozzle. In order to vary the vacuum about the bottom plate 242d, the nozzle 250 is designed such that the effective open area formed in the bottom plate 242d can be varied manually or through a computerized controller. With particular reference to FIG. 6, it is seen that the bottom plate 242d includes a series openings 252 formed in the bottom thereof. Adjacent each opening 252, there is provided a sliding closure panel 253. Each closure panel 253 can be moved back and forth so as to cover and close selected portions of the openings 252. This will effectively vary the suction force about the bottom plate 242d of the suction nozzle 250.

Now turning to the oil-water separation sub-system indicated generally by the numeral 22, it is seen that the same is disposed on vessel 32. Oil-water separation sub-system 22 of the present invention includes a series of aligned tanks, each tank being indicated generally by the numeral 200. In the case of the embodiment disclosed, the oil-water separation sub-system 22 includes a series of five overflow tanks, but it is appreciated that the number of tanks may vary depending upon the size of the tanks and the particular operation involved. Each tank 200 includes a surrounding wall structure 202 that includes a tapered bottom 202a. In order that oil and oil-water mixture may flow from tank to tank, the surrounding wall 202 is provided with a wall opening 202b. Disposed adjacent wall opening 202b is a gate 202c which can be moved between an open and closed position with respect to the wall opening 202b.

Formed in the bottom of each tank is a bottom opening 204 that is communicatively connected to a control valve 206 that joins an elongated water outlet line 208 that effectively connects to each of the tanks 200. A waterpump 210 is connected to the water outlet line 208 for pumping separated water from individual tanks 200. Extending from the remote or distal end of the water outlet line 208 is an adjustable outlet 208a that enables separated water to be returned to the oil collecting area 54 defined within the floating boom structure. It is appreciated that the outlet end 208a of the water line is adjustable and can assume an extended position, as shown in FIG. 1, or can be folded or positioned to where it lies adjacent the vessel 32.

Viewing the first oil-water separation tank 200, the tank disposed adjacent the outlet end 272 of the final suction line 268, it is seen that there is provided an inlet basin 213 formed about an upper portion of that tank. Disposed above the inlet basin 213 and adjacent the outlet end 272 of the final suction line 216 is a baffle 212. It is thus seen that the oil and oil-water mixture being expelled by the final suction line 268 is effectively agitated and controlled by the basin 213 in the associated baffle 212.

The last and rearmost oil-water separator tank 200 is provided when an oil outlet 214 that is associated with an oil outlet control valve 215. From oil outlet control valve 215, there is provided an oil outlet line 217 that leads to an oil storage tank 218 that is carried on the vessel 32 or by another accompanying or towed vessel.

To facilitate the separation of oil and water in cold climates and where the oil-water separation process is subjected to relatively cool temperatures, each tank is provided with heating coils in the walls 202.

To control the flow of water, oil-water mixture and oil from the tanks 200, each tank is provided with upper and lower acoustical sensors 222 and 224 respectively. In effect, these sensors sense and measure the specific gravity of the liquid in the vicinity of each sensor. This specific gravity information is utilized by the computer logic control system 20 of the present invention to control valves 206 and 215. As particularly illustrated in FIG. 1, since the oil's specific gravity is less than water, oil will tend to settle about the top portions of the respective tanks 200. The object of the oil-water separation process is to expel oil of a threshold concentration through the oil outlet control valve 215 and to expel water or a high water-low oil mixture concentration through the bottom control valve 206 that joins water outlet line 208. The respective sensors 222 and 224 are effective to control the discharge of water from the respective tank. Thus, the sensors 222 and 224 are operative to effectuate the control of the oil outlet control valve 215 to assure that oil of a threshold concentration is discharged from the final tank.

It should be pointed out that while tanks 200 function to separate oil from water, the tanks 200 can further be utilized to actually store separated oil. By selectively closing respective gates 202C at selected times has the effect of converting a separating tank to a storage tank. By closing gate 202c, overflow from a preceding tank is shut off.

In the present embodiment, the oil removal system 10 of the present invention is incorporated into a vessel 32. The size and type of vessel can vary depending on a particular application. However, it is advantageous for the vessel to have twin diesel engines 28 and to include spuds 30 which enable the vessel 32 to maneuver in close proximity to other vessels especially a vessel that is expelling oil through an oil leak in the wall or tank of the vessel. This obviously enables the vessel 32 carrying the oil recovery system 10 to move in close proximity to the actual oil leak and to remove oil in an area close to the actual oil spill.

Figure 8:
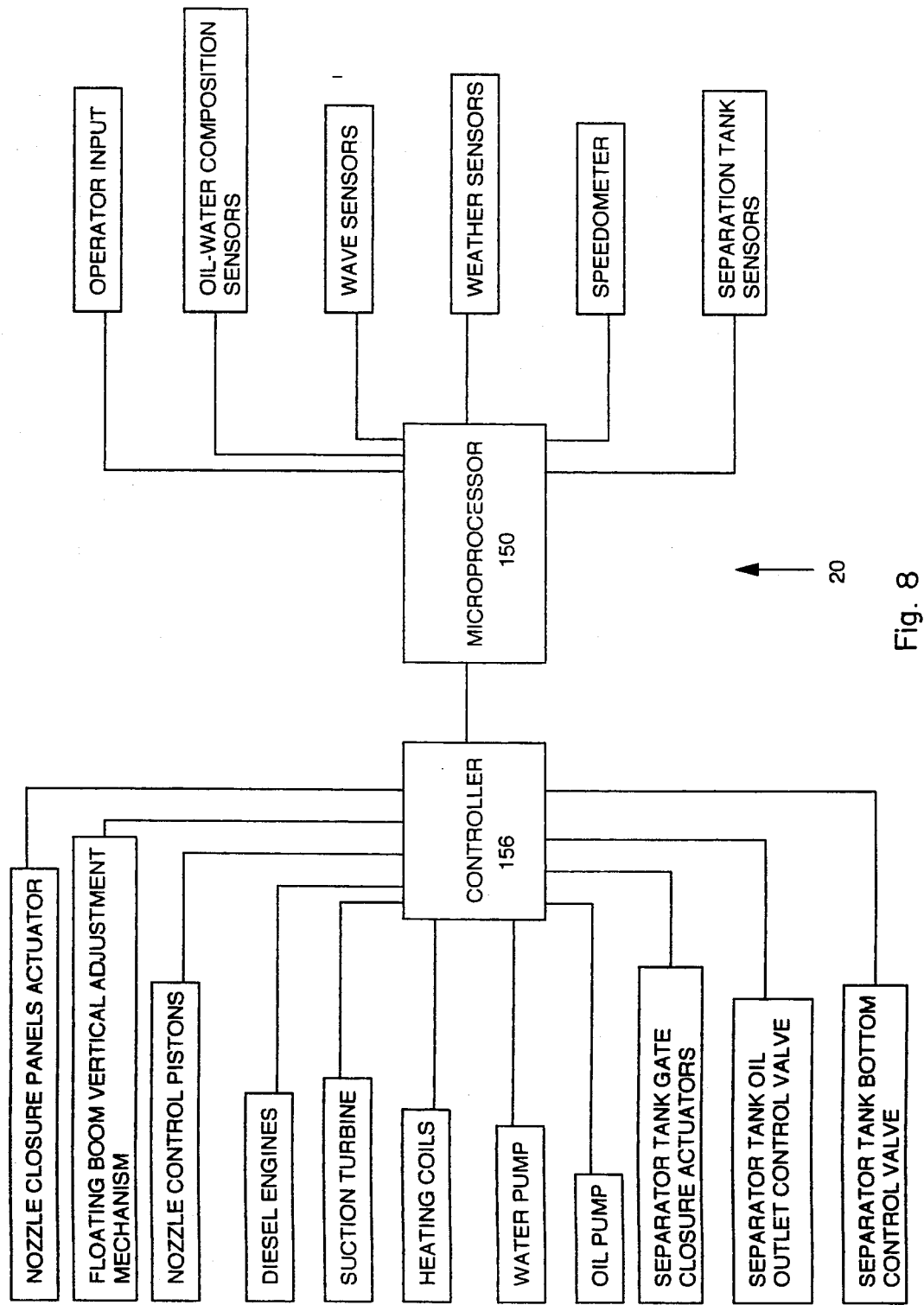
FIG. 8 is a block diagram illustrating the computer control system of the present invention.

The present invention makes extensive use of computer logic control system 20 which is shown in block diagram form in FIG. 8. Computer logic control system 20 controls the deployment of floating boom structure 14, the oil skimming process, and the oil-water separation and storage processes. Except for the need for external navigation means, computer logic control system 20 allows the oil recovery system 10 to be operated fully automatically. The oil recovery system 10 may also be operated in a semi-automatic or manual mode. In these modes, the commands of the computer logic control system 20 commands are overridden or modified as desired by the operator. Controller 156 and microprocessor 150, which form the computer logic control system 20, are conventional hardware. The basic programs used by microprocessor 150 are commonly and commercially available. The input sensors (rotary potentiometers, nautical speedometer, acoustical specific gravity sensors, and thermometers) are all conventional hardware commonly used in similar applications.

When the oil recovery system 10 is in the non-operational mode or traveling to the site of an oil spill, floating boom structure 14 is maintained in an elevated position to avoid drag. When the oil recovery system 10 has reached the site of the spill, the operator may deploy floating boom structure 14 manually, or he may signal computer logic control system 20 to deploy it automatically. Floating boom structure 14 is deployed by retracting hydraulic control piston assembly 100. In the automatic mode, controller 156 actuates piston assembly 100 until oil-water composition sensors 158 signal the presence of water to microprocessor 150 which in turn signals controller 156 to cease actuation.

Optimal oil skimming is accomplished by the interactive operation of computer logic control system 20, nozzle control pistons 254, 256 and 258, turbine 270, diesel engines 28, block and tackle 62, and operator input. Computer logic control system 20 utilizes wave sensors 152, acoustical water condition sensors 158, weather sensors (not shown), and microprocessor 150 to generate a wave profile. Nozzle position, suction, and vessel speed are manipulated in accordance with this wave profile. Nozzle 250 may be tilted, moved up and down and side to side by controlling cylinder 254, 256, and 258. The degree of suction at nozzle 250 may be varied by adjustment of closure panels 253 and turbine 270. The size of oil collecting area 54 may be varied by adjusting block and tackle 62. Vessel speed is controlled via diesel engines 28. Operator input may either vary or completely override control by computer logic control system 20.

Figure 9:
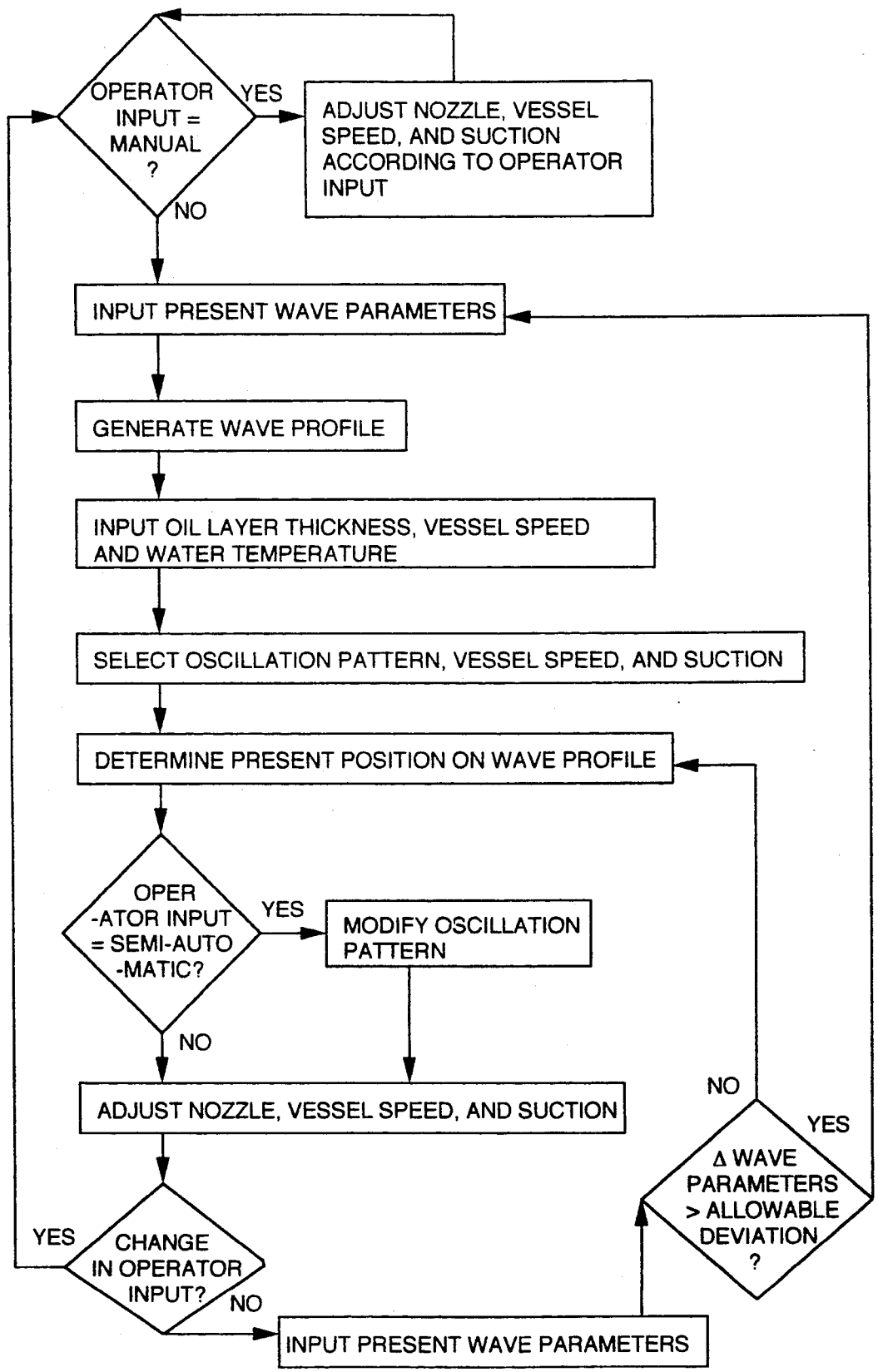
FIG. 9 is a flow chart illustrating a computer logic circuit for controlling the movement and position of the nozzle.

FIG. 9 is a flow chart diagram representing the computer logic used in controlling the nozzle position, vessel speed, and suction at the nozzle. If operator input signals manual operation, then all manipulations of nozzle position, suction, and vessel speed are directly controlled by subsequent operator input until computer logic control system 20 is returned to automatic or semi-automatic operation. If operator input signals automatic or semi-automatic operation, wave sensors (rotary potentiometers) 152 measure wave velocity, wave amplitude, and wave direction and input these parameters to microprocessor 150. Microprocessor 150 generates a cyclic, dynamic wave profile based on the inputted conditions using an appropriate water surface profile program. Such programs are commonly and commercially available. Acoustical sensors 158 measure the thickness of the oil layer on the water surface and this measurement is fed to microprocessor 150. Additionally, the vessel speed measured by an onboard nautical speedometer and the water temperature are inputted to microprocessor 150. Based on these parameters and the cyclic, dynamic wave profile, microprocessor 150 selects an optimal nozzle oscillation pattern, vessel speed, and suction level. The oscillation pattern may include cyclic adjustment of nozzle pitch, cyclic movement of nozzle 250 up and down, side to side or a combination of these. After microprocessor 150 has developed an appropriate oscillation pattern, it determines the present position of nozzle 250 on the generated wave profile using input from wave sensors 152. If computer logic control system 20 is operating in the semi-automatic mode, then the oscillation pattern, vessel speed, and/or suction level are modified to comply with the operator's commands.

Based on the output of microprocessor 150, controller 156 (FIG. 8) controls the movement of nozzle 250, the degree of suction and the speed of vessel 32. Controller 156 controls vessel speed by increasing or reducing the output of diesel engines 28. The degree of suction is controlled by varying the speed of turbine 270 for large variations and by opening or closing closure panels 253 for smaller variations in suction. Controller 156 manipulates nozzle 250 by means of hydraulic control pistons 254, 256 and 258. For example, extending left piston 256 and right piston 258 while holding stationary or retracting central piston 254 results in an upward tilting of nozzle 250. Extending central piston 254 while holding stationary or retracting left 256 and right 258 hydraulic control pistons causes nozzle 250 to tilt downward. Extending all three hydraulic control pistons 254, 256 and 258 causes nozzle 250 to move downward and thereby deeper into the water. Retracting all three hydraulic control pistons 254, 256 and 258 results in upward movement of nozzle 250. By extending or retracting either left piston 256 or right piston 258 while holding the other stationary or actuating it in the opposite direction, nozzle 250 may be turned to one side or the other.

It should be noted that because nozzle 250 is universally mounted by flexible telescopic coupling 264 and because each of the three hydraulic control pistons 254, 256 and 258 can be independently retracted, extended or held stationary, nozzle 250 can be tilted, moved up and down and/or side to side simultaneously. It is this capability which allows nozzle 250 to be controlled in accordance with the generated wave profile and thereby maintained at the water's surface. Present wave conditions are continuously measured by wave sensors 152. Any significant change in conditions is re-entered into microprocessor 150 so that the wave profile and consequently the oscillation pattern, suction, and vessel speed are continuously and immediately modified.

If the operator input is changed to manual, computer logic control system 20 and the related wave profile are no longer used and the various operations will be directly controlled by operator input until operator input signals a return to automatic or semi-automatic operation.

The oil-water separation sub-system is indicated generally by the numeral 22. Oil-water mixture is induced by turbine 270 into nozzle 250 and through rigid suction line 266 and final suction line 268. Oil-water mixture exits final suction line 268 at outlet end 272 and enters basin 213. By passing through basin 213, the oil-water mixture is quieted to nearly laminar flow. As shown in FIGS. 1 and 2, there are five separator tanks 200. The number of tanks is a design choice depending on several factors including available vessel space. The tank walls 202 each extend to top 201. Each interior tank wall 202 from front (between first and second tanks) to rear (between fourth and fifth tanks) of vessel 32 has a somewhat lower wall opening 202b than the prior wall 202. As the oil-water mixture level in each tank 200 rises, oil-water mixture at the surface of that tank overflows into the next tank. Because water is more dense than oil, the oil-water mixture increases in oil concentration from the top to the bottom of each tank 200. As oil-water mixture overflows from tank-to-tank and the water content settles to the bottom, the concentration of the oil near the surface increases with successive tanks. The oil-water mixture deposited in the last tank is of a sufficient or threshold oil concentration for salvage.

In the embodiment shown in FIGS. 1 and 2, storage compartment 218, which may be an onboard storage tank or a tanker barge, is used to store salvaged oil. Oil of the desired concentration is exited through oil outlet 214. Oil flow is controllable by oil outlet control valve 215. Oil is induced through oil outlet line 213 and into storage compartment 218 by oil pump 216 and the hydrostatic force of the last tank.

To maintain steady-state operation, the oil-water mixture having insufficient oil concentration must also be removed (at a rate equal to the difference between the oil removal rate and the oil/water mixture intake rate). Each tank has a bottom opening 204. Flow through bottom opening 204 is controlled by bottom control valve 206. Oil-water mixture exiting any tank 200 through bottom opening 204 enters common water outlet line 208 and is induced to exit adjustable outlet 208a by water pump 210 and the hydrostatic forces of the open tanks. In the operational mode, adjustable outlet 208a is positioned over oil collecting area 54 of floating boom structure 14. Hence, the exhausted oil-water mixture is recycled so that a minimal amount of oil is deposited back into the body of water. This provision addresses regulatory concerns relative to increased pollution by dispersion caused during the recovery process.

Figure 10:
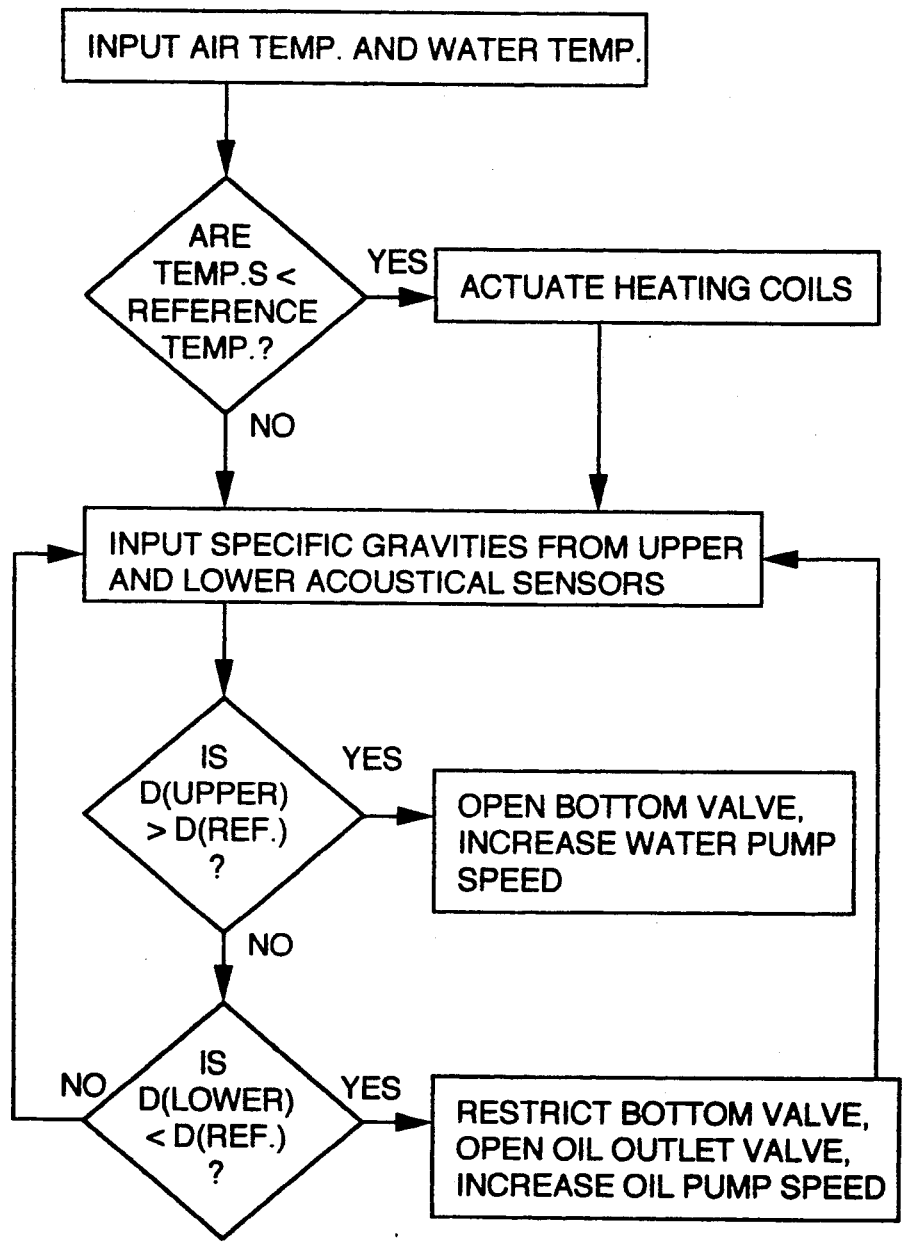
FIG. 10 is a flow chart illustrating the computer logic utilized with the present invention in controlling the oil-water separation sub-system forming a part of the present invention.

Computer logic control system 20 operates interactively with upper and lower acoustical sensors 222 and 224, heating coils 220, oil pump 216, water pump 210, bottom control valve 206, oil outlet control valve 215, gate closures 202c, and weather sensors 154. FIG. 10 is a flow chart diagram of the oil-water separation sub-system's 22 computer controlled operation.

If the oil-water mixture is cold, separation is impeded. To compensate for the coldness of the oil-water mixture and thereby improve the separation process, the present invention utilizes heating coils 220 to heat the oil-water mixture to a preferred temperature. Weather sensors 154 measure the ambient air and water temperatures. These parameters are inputted to microprocessor 150 which compares them to reference temperatures. If the actual air and water temperatures are less than the reference temperatures, controller 156 actuates heating coils 220 as necessary to compensate.

To insure that the oil-water mixture deposited into the final tank 200 is of sufficient oil concentration for salvaging, only oil-water mixture of sufficient oil concentration can be allowed to overflow into the next tank. The required oil concentration differs for each tank 200. Successive tanks should have greater oil concentration. Because oil is less dense than water, the oil-water mixture increases in density from the top to the bottom of the tank 200. If the oil-water mixture is too dense at the top, then the fluid level must be lowered to avoid transferring oil-water mixture of inadequate oil concentration to the next tank. If the oil-water mixture is not sufficiently dense at the bottom, then oil-water mixture flowing into the water outlet line must be restricted because it has sufficient oil concentration for salvaging.

The present invention maintains appropriate concentrations of oil and water at the surface and at the bottom of each tank by means of computer logic control system 20, upper acoustical sensors 222, lower acoustical sensors 224, water pump 210, bottom control valve 206, oil pump 216 and oil outlet control valve 215. Upper and lower sensors 222 and 224 measure the specific gravity of the oil-water mixture at the upper and lower levels in each tank and input these measurements to microprocessor 150. Each tank has a particular reference density which corresponds to a particular concentration of oil. If the measured density at upper sensor 222 is greater than the corresponding reference density, then the oil concentration at the top of the tank is insufficient for transfer to the next tank. To compensate, controller 156 opens the bottom control valve 206 of that tank and increases the speed of water pump 210 to accommodate the increased volume. Resultantly, the oil-water mixture having low oil concentration is removed and eventually replaced with greater oil concentrations as more oil-water mixture is introduced from the preceding tank 200 or final suction line 268. If the measured density at lower sensor 224 is less than the corresponding reference density, then the oil concentration at the bottom of the tank is sufficient for transfer to the next tank. In this case, controller 156 restricts bottom control valve 206 so that the level of the oil-water mixture is raised and the overflow to the next tank 200 is increased. Controller 156 also opens oil outlet control valve 215 and increases the speed of oil pump 216 to accommodate the increased volume of salvageable oil.

The operations discussed above are performed continuously on each tank. The integrated computer control of the separation process provides greater efficiency of separation and thereby faster and more complete oil salvage.

When storage compartment 218 is filled to capacity or unavailable, it may be desirable to use tanks 200 for storage of salvaged oil. In tank storage mode, computer logic control system 20 closes oil outlet control valve 215 completely and ceases operation of oil pump 216. Computer logic control system 20 continues to control bottom control valves 206 to optimize the separation process. However, bottom control valve 206 of the aft-most tank remains open until the density measured by lower sensors 224 of that tank equals the reference density. At this time, the aft-most tank will be substantially filled with salvageable oil. Gate closure 202c is then used to cover the wall opening 202b between the fourth and fifth tanks, and the bottom control valve 206 of the fifth tank is completely sealed. Resultantly, the aft-most tank is completely sealed and substantially filled with salvaged oil. The process is continued from tank to tank, from the aft-most tank to the forward tank, under the direction of computer logic control system 20, until all tanks 200 are filled with oil of sufficient concentration for salvage.

What is claimed is:

1. An oil removal system adaptable for use with a vessel for collecting and removing oil from the surface of a body of water comprising:
    a) a floating boom structure extending from the vessel and including a forwardly diverging floatation unit adapted to float on the body of water and defining an oil collecting area interiorly of the diverging floatation unit;
    b) means for moving the floating boom structure between an elevated inoperative position above the surface of the water and an operative floating position;
    c) an oil skimming nozzle having a head, moveable independently of the diverging floatation unit but disposed generally interiorly of the floatation unit in the oil collecting area;
    d) means operatively connected to the nozzle for powering the nozzle and generating a vacuum at the nozzle for inducing oil lying on the surface of body of water into the nozzle;
    e) means for moving the nozzle up and down independently of the diverging floatation unit such that the nozzle head may move and follow the surface of the water so as to effectively skim an oil water mixture from the surface of the water;
    f) the means for moving the nozzle head up and down including sensor and computer means for monitoring wave conditions, generating a surface profile, and controlling the up and down movement of the nozzle head in accordance with the surface profile; and
    g) means for conveying the oil and water mixture away from the nozzle.

2. The oil removal system according to claim 1 including means for receiving the oil and water mixture conveyed away from the nozzle and means for separating the oil from the water.

3. The oil removal system according to claim 2 wherein the means for receiving the oil and water mixture and for separating the oil from the water includes a series of separator tanks including valves controlled by the sensor and computer means.

4. The oil removal system according to claim 2 including means on the vessel for receiving the oil separated.

5. The oil removal system according to claim 2 including means for returning the separated water and oil-water mixture to the interior of the diverging floatation unit so that the same may be recycled and further separated.

6. The oil removal system according to claim 2 wherein the means for separating the oil from the water includes means for heating the oil and water mixture to facilitate separation under cold conditions.

7. The oil removal system according to claim 1 wherein the means for generating a vacuum at the nozzle includes a turbine.

8. The oil removal system according to claim 1 including means for moving the nozzle head side to side, and fore and aft with respect to the vessel, independently of the floatation unit and wherein movement of the nozzle is controlled by the computer means.

9. The oil removal system of claim 1 including means for anchoring the vessel beside a second vessel so as to minimize spillage oil from the second vessel.

10. The oil removal system of claim 1 including means operatively connected to the diverging floatation unit for varying the oil collecting area defined by the floatation unit.

11. An oil removal system adapted for use with a vessel for collecting and removing oil from the surface of a body of water, comprising:
    (a) means for sensing a plurality of water surface variables;
    (b) computer means for receiving the water surface variables and creating a water surface profile;
    (c) an oil skimming nozzle forming a part of the oil removal system;
    (d) a support structure for supporting the nozzle;
    (e) means operatively connected to the nozzle for powering the same and generating a vacuum at the nozzle for inducing oil lying at the surface of the body of water into the nozzle; and
    (f) nozzle control means operatively connected to the computer means for continuously controlling up and down movement of the nozzle in accordance with the water surface profile generated by the computer means such that the nozzle is movable about the surface of the water for efficiently skimming irrespective of oil layer depth, wave amplitude, wave velocity, wave direction, and water temperature.

12. The oil removal system according to claim 11 wherein the nozzle control means includes means for moving the nozzle up and down and side-to-side, and for varying the pitch of the nozzle.

13. The oil removal system according to claim 11 wherein the system further includes means for varying and controlling the vacuum created at the nozzle for more efficiently extracting the oil from the water's surface.

14. The oil removal system according to claim 11 wherein the system further includes an oil-water separation sub-system and wherein there is flow control means operatively connected between the computer means and the oil-water separation sub-system for controlling the oil-water separation process.

15. The oil removal system according to claim 11 including an oil-water separation sub-system including a series of overflow tanks, a series of water outlet valves connected to the respective tanks, at least one oil outlet control valve connected to one of the tanks, and a series of sensor means disposed at selected levels within the respective tanks for determining the oil and water concentrations at the selected levels within the tanks; and wherein the computer means is operatively associated with the oil-water separation sub-system for receiving information relative to the oil and water concentrations at the selected levels within the tanks and for controlling final discharge of oil and water from the tanks via the water outlet control valve and the oil outlet control valve.

16. A method for collecting and removing oil from the surface of a body of water using an oil removal system adapted for use with a vessel and having a suction nozzle, comprising the steps of:
   (a) sensing a plurality of water surface variables;
   (b) inputting the water surface variables to a computer means;
   (c) generating a water surface profile using the computer means;
   (d) generating a vacuum at the nozzle for inducing oil laying at the surface of the body of water into the nozzle; and
   (e) continuously controlling the movement of the nozzle in accordance with the water surface profile created by the computer means such that the nozzle may effectively skim the surface of the water irrespective of changes in oil layer depth, wave amplitude, wave velocity, wave direction, and water temperature.

17. The method for collecting and removing oil according to claim 16 further including the step of separating the collected oil and water using a computer controlled separation sub-system.

18. The method for collecting and removing oil according to claim 17 wherein the step of separating the collected oil and water includes the steps of:
   (a) collecting the oil nd water mixture within a series of overflow tanks having a series of return outlets for returning water and oil-water mixtures of insufficient oil concentration back to the body of water, and at least one oil outlet for discharging separated oil-water mixture having an acceptable threshold oil concentration;
   (b) determining the oil concentration of the oil-water mixture at selected levels within each overflow tank; and
   (c) controlling the discharge of the oil-water mixture through the return outlets based on the determined oil concentrations such that only the oil-water mixture having oil concentration of at least the threshold of oil concentration associated with the particular overflow tank is overflowed to the subsequent tank, and all other oil-water mixture is discharged to the body of water.

19. The method for collecting and removing oil according to claim 16 further including the steps of:
   (a) creating an oil collection area around the nozzle by disposing a floating boom structure that tends to confine an area of oil in and around the nozzle;
   (b) raising and lowering the boom structure between an elevated transport position and a lowered, water engaging position; and
   (c) adjusting the oil collection area by opening and closing the floating boom structure.

20. An oil removal system adaptable for use with a vessel for collecting and removing oil from the surface of a body of water, comprising:
   (a) a floating boom structure extending from the vessel and including a forwardly diverging floatation unit adapted to float on the body of water and defining an oil collecting area interiorly of the diverging floatation unit;
   (b) means for moving the floating boom structure between an elevated inoperative position and an operative floating position;
   (c) means operatively mounted to the floating boom structure for varying the size of the collecting area defined interiorly of the diverging floatation unit;
   (d) an oil skimming nozzle mounted independently of the diverging floatation unit but disposed generally interiorly of the floatation unit in the oil collecting area;
   (e) means for sensing a plurality of water surface variables;
   (f) computer means for receiving the water surface variables and creating a water surface profile;
   (g) nozzle control means operatively connected to the computer means for continuously controlling up and down, side to side, and fore and aft movement of the nozzle in accordance with the water surface profile generated by the computer means such that the nozzle is movable about the surface of the water for efficiently skimming irrespective of oil layer depth, water temperature, and wave amplitude, wave velocity and wave direction;
   (h) means associated with the nozzle for generating a vacuum at the nozzle for inducing oil laying on the surface of the body of water into the nozzle such that such that an oil/water mixture enters the nozzle;
   (i) means for separating the oil and water from the oil/water mixture induced into the nozzle;
   (j) means for conveying the oil and water mixture from the nozzle to the separator means; and
   (k) means for conveying separated water back the oil collecting area.

21. The oil removal system of claim 20 including means for conveying separated oil from the separator means to a storage means on an associated vessel.

22. The oil removal system of claim 20 wherein the separator means includes heater means to facilitate separation during cold weather.

23. An oil removal system adapted for use with a vessel for collecting and removing oil from the surface of a body of water comprising: a floating boom structure extending from the vessel and including a forwardly diverging flotation unit adapted to float on the body of water and defining an oil collecting area interiorly of the diverging floating unit; means for moving the floating boom structure between an elevated inoperative position above the surface of the water and an operative floating position; an oil and water vacuum system for vacuuming oil and oil and water mixtures from the surface of the water; the oil and water vacuum system including an oil skimming nozzle mounted on the floating boom structure above the water and wherein the oil skimming nozzle extends downwardly towards the surface of the body of water and includes an inlet through which oil and oil and water mixtures pass; the vacuum system further including means for generating a vacuum within the oil skimming nozzle for inducing oil and oil and water mixtures upwardly from the body of water into the inlet of the nozzle; means for orienting and moving the oil skimming nozzle up and down independently of the diverging floatation unit such that the oil skimming nozzle may move and follow the surface of the water so as to effectively skim oil and oil and water mixtures from the surface of the water; and means for conveying the oil and oil and water mixtures induced into the nozzle away from the nozzle.

* * * * *